United States Patent
Dwyer et al.

(10) Patent No.: US 9,215,330 B2
(45) Date of Patent: Dec. 15, 2015

(54) SYSTEM, METHOD, AND APPARATUS FOR SIGNALING A WEATHER CONDITION

(75) Inventors: Kendra Dwyer, Wellsville, KS (US); Jeffrey Michael Sweeney, Olathe, KS (US); Kelsyn Donel Rooks, Overland Park, KS (US); Mark L. Wilmoth, Gardner, KS (US); Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1233 days.

(21) Appl. No.: 12/258,254

(22) Filed: Oct. 24, 2008

(65) Prior Publication Data

US 2010/0104073 A1    Apr. 29, 2010

(51) Int. Cl.
*H04M 11/04*  (2006.01)
*H04M 11/08*  (2006.01)

(52) U.S. Cl.
CPC .............. *H04M 11/08* (2013.01); *H04M 11/04* (2013.01)

(58) Field of Classification Search
CPC ..... H04M 11/08; H04M 11/04; G08B 27/006
USPC ............ 379/37, 39, 51, 45, 48; 340/601, 532, 340/539.28, 854.7; 73/170.16; 381/104; 725/33
See application file for complete search history.

(56) References Cited

U.S. PATENT DOCUMENTS

| | | | |
|---|---|---|---|
| 5,390,237 A | 2/1995 | Hoffman, Jr. et al. | |
| 5,740,538 A | 4/1998 | Joyce et al. | |
| 6,177,873 B1 * | 1/2001 | Cragun | 340/601 |
| 6,462,665 B1 | 10/2002 | Tarlton et al. | |
| 6,650,902 B1 | 11/2003 | Richton | |
| 6,914,525 B2 | 7/2005 | Rao et al. | |
| 6,995,686 B2 | 2/2006 | Gosdin et al. | |
| 7,054,612 B2 | 5/2006 | Patel | |
| 7,079,631 B1 | 7/2006 | Kaufman | |
| 7,233,781 B2 * | 6/2007 | Hunter et al. | 455/404.1 |
| 7,672,233 B2 * | 3/2010 | Koch et al. | 370/230 |
| 8,682,280 B1 | 3/2014 | Sennett et al. | |
| 8,698,640 B1 | 4/2014 | Gropper | |
| 2003/0097262 A1 | 5/2003 | Nelson | |
| 2003/0125876 A1 * | 7/2003 | Root et al. | 702/3 |
| 2004/0043760 A1 | 3/2004 | Rosenfeld et al. | |
| 2004/0172657 A1 * | 9/2004 | Phillips et al. | 725/110 |
| 2005/0009508 A1 | 1/2005 | Graske et al. | |
| 2005/0030977 A1 * | 2/2005 | Casey et al. | 370/485 |

(Continued)

OTHER PUBLICATIONS

Weatherline, Inc. Weather Now, Get Your Local Weather, http://www.weatherline.com/cgi/citysearch.asp, date unknown, p. 1.

(Continued)

*Primary Examiner* — Vivian Chin
*Assistant Examiner* — Con P Tran
(74) *Attorney, Agent, or Firm* — Swanson & Bratschun, L.L.C.

(57) ABSTRACT

The illustrative embodiments described herein are directed to a system, method, and apparatus for signaling a weather condition. In one embodiment, the system may include an optical network terminal. The optical network terminal may include a communication port adapted to be coupled to a fiber optic cable. The communication port may be further adapted to receive data that indicates a weather condition via the fiber optic cable. The optical network terminal may also include an output unit, in communication with the communication port, adapted to send a signal in response to the communication port receiving the data that indicates the weather condition.

9 Claims, 3 Drawing Sheets

(56) References Cited

U.S. PATENT DOCUMENTS

| | | | |
|---|---|---|---|
| 2005/0037728 A1 | 2/2005 | Binzel et al. | |
| 2006/0055527 A1* | 3/2006 | Pugel | 340/517 |
| 2006/0154690 A1 | 7/2006 | Hess | |
| 2006/0267783 A1 | 11/2006 | Smith | |
| 2007/0136743 A1* | 6/2007 | Hasek et al. | 725/33 |
| 2009/0102644 A1 | 4/2009 | Hayden | |
| 2009/0316671 A1 | 12/2009 | Rolf et al. | |
| 2010/0087138 A1 | 4/2010 | Hedstrom | |
| 2010/0210248 A1 | 8/2010 | Morrissey et al. | |
| 2011/0230204 A1 | 9/2011 | Root et al. | |
| 2011/0302615 A1* | 12/2011 | Helferich | 725/62 |

OTHER PUBLICATIONS

Post-Gazette Now, "Gloomy Day: It's End of the Line for 936-1212," by Gary Rotstein, http://www.post-gazette.com/pg/08271/915611-85.stm, Sep. 27, 2008, pp. 1-3.

U.S. Appl. No. 12/371,270; Non-Final Rejection dated Dec. 31, 2014; 23 pages.

U.S. Appl. No. 12/371,270; Final Rejection dated Mar. 21, 2014; 19 pages.

U.S. Appl. No. 12/371,270; Final Rejection dated Mar. 27, 2013; 16 pages.

U.S. Appl. No. 12/371,270; Final Rejection dated Oct. 14, 2011; 13 pages.

U.S. Appl. No. 12/371,270; Non-Final Rejection dated Mar. 30, 2011; 24 pages.

U.S. Appl. No. 12/371,270; Non-Final Rejection dated Sep. 12, 2013; 15 pages.

U.S. Appl. No. 12/371,270; Non-Final Rejection dated Dec. 18, 2012; 24 pages.

U.S. Appl. No. 12/371,270; Final Rejection dated Jul. 29, 2015; 21 pages.

* cited by examiner

SYSTEM, METHOD, AND APPARATUS FOR SIGNALING A WEATHER CONDITION

BACKGROUND OF THE INVENTION

1. Field of the Invention

The illustrative embodiments relate generally to a system, method, and apparatus for signaling a weather condition.

2. Description of the Related Art

Certain weather conditions, especially severe weather conditions, can adversely affect the safety of individuals located in the vicinity of the weather condition. Harm to individuals that are affected or potentially affected by a particular weather condition may be mitigated or prevented by notifying these individuals of the presence or existence of the weather condition. Such notification allows these individuals to take appropriate safety precautions.

BRIEF SUMMARY OF THE INVENTION

To alleviate one or more of the existing problems with signaling a weather condition, the illustrative embodiments described herein are directed to a data processing system and, in particular, to a system, method, and apparatus for signaling a weather condition. In one embodiment, the system may include an optical network terminal. The optical network terminal may include a communication port adapted to be coupled to a fiber optic cable. The communication port may be further adapted to receive data that indicates a weather condition via the fiber optic cable. The optical network terminal may also include an output unit, in communication with the communication port, adapted to send a signal in response to the communication port receiving the data that indicates the weather condition.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
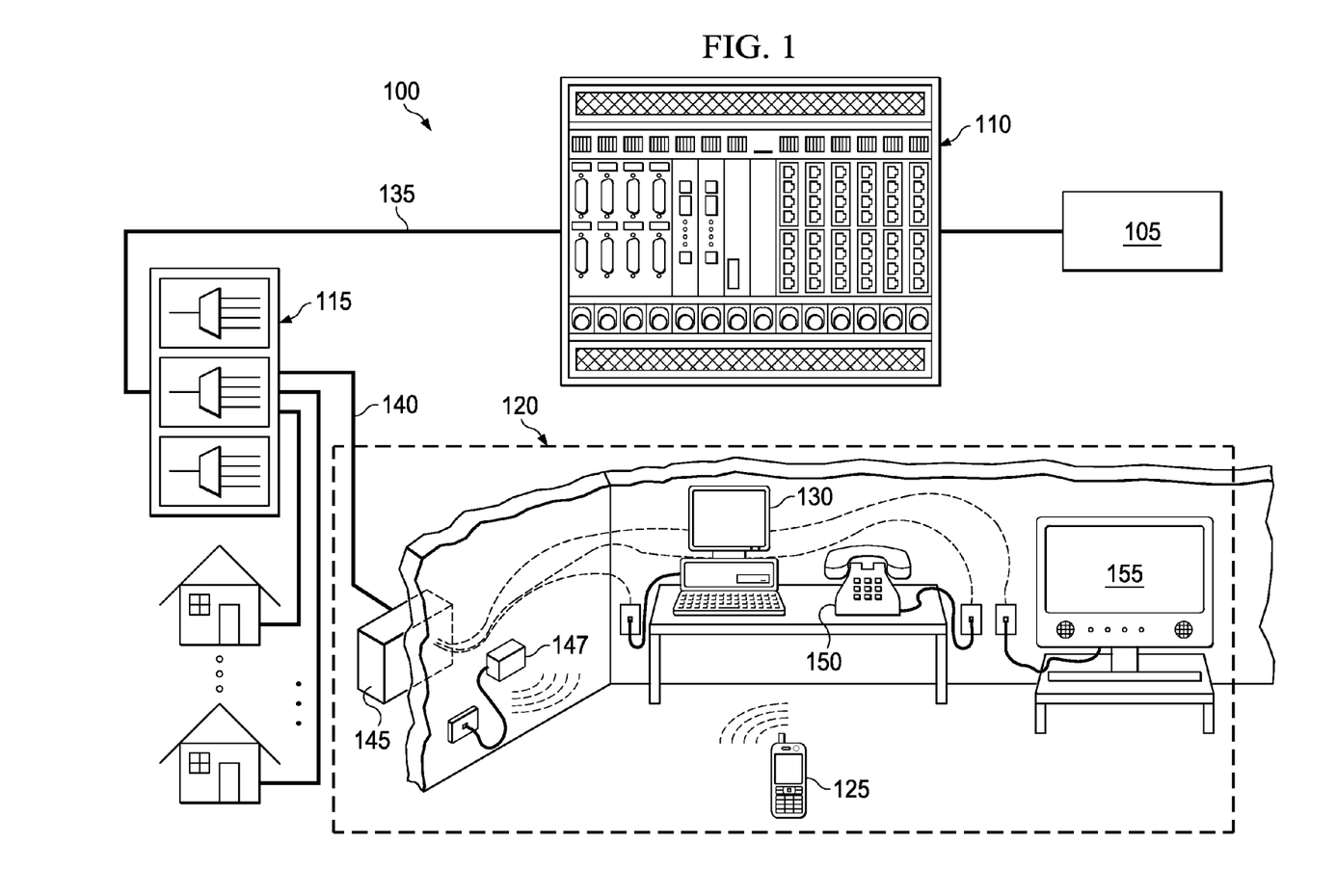
FIG. 1 is a pictorial representation of a communications system in which the illustrative embodiments of the present invention may be implemented.

FIG. 1 is a pictorial representation of a communications system in accordance with an illustrative embodiment. The communications system 100 of FIG. 1 includes various elements used for wireless and wired communication. The communications system 100 includes a data source 105, an optical line terminal 110, an optical splitter 115, and optical network terminal 145, and a building site 120. The different elements and components of the communications system 100 may communicate using wireless communications, such as satellite connections, WiFi, WiMAX, CDMA wireless networks, and/or hardwired connections, such as fiber optics, TI, cable, DSL, high speed trunks, and telephone lines. In one particular example, the communications system 100 is a passive optical network (i.e., PON) that uses fiber optics to transfer data to and from the building site 120. The communications system 100 may also be an active optical network (i.e., AON). The communications system 100 may employ any Fiber to the X, or FTTX, configuration, including Fiber to the Premises (FTTP), Fiber to the Node/Neighborhood (FTTN), Fiber to the Cabinet (FTTCab), Fiber to the Curb (FTTC), Fibre to the Kerb (FTTIK), Fiber to the Building (FTTB), or Fiber to the Home (FTTH).

Communications within the communications system 100 may occur on any number of networks which may include wireless networks, data or packet networks, cable networks, satellite networks, private networks, publicly switched telephone networks (PSTN), the wired network 118, or other types of communication networks. A communications network is infrastructures for sending and receiving messages and signals according to one or more designated formats, standards, and protocols. The networks of the communications system 100 may represent a single communication service provider or multiple communications services providers. The features, services, and processes of the illustrative embodiments may be implemented by one or more elements of the communications system 100 independently or as a networked implementation.

The communications system 100 may include data source 105. The data source 105 may be a source of high speed data to the optical line terminal 110. The data source 105 may also be any data network that is in communication with the optical line terminal 110. For example, the data source 105 may be a public switched telephone network (PSTN). The data from the data source 105 may be delivered using plain old telephone service, or POTS, and may be in a range of 1310 nm to 1490 nm. The data source 105 may also be the Internet.

The communications system 100 may include the optical line terminal 110, which may be located at a central office, remote cabinet, or at a business location serving as a private branch exchange. As described further below, the optical line terminal 110 may perform one or more operations that facilitate the signaling of a weather condition at building site 120. The optical line terminal 110 may act as a point of origination for transmissions in an FTTX communication system. The optical line terminal 110 may be a wire-line switch or public exchange using time domain multiplexing to provide telecommunications services to a particular subscriber or groups of subscribers. The optical line terminal 110 may provide dial-tone, calling features, and additional digital and data services to subscribers. The optical line terminal 110 may also enable VoIP communication of the devices, such as communication device 125 and/or client 130 at building site 120, through a data network. VoIP works by sending voice information in digital form, such as packets, rather than using the traditional circuit-committed protocols of the publicly switched network. The optical line terminal 110 may be or include a feature server, a call control agent, or an IP gateway for implementing VoIP communications. In one example, the optical line terminal may be a Broadband Digital Loop Carrier (BBDLC). The optical line terminal 110 may also be configured to execute software or program code with instructions for signaling a weather condition at building site 120.

The optical line terminal 110 may be in communication with the optical splitter 115 via communication line 135. In one embodiment, the communication line 135 is a single optical fiber. The optical splitter 115 may be used to distribute data from the communication line 135 to the multiple destinations, including building site 120. The optical splitter 115 may employ a centralized splitter design in which multiple optical splitters are contained in the same housing. Each optical splitter 115 may distribute the data from communication line 135 to any number of destinations, such as 32. In the embodiment in which the communications system 100 is a passive optical network, the optical splitter 115 may be unpowered. In the embodiment in which the communications system 100 is an active optical network, the optical splitter 115 may be powered.

A communication line 140, which may be a fiber optic cable, may transfer data between optical splitter 115 and the optical network terminal 145 at the building site 120. In one example, the optical network terminal 145 may convert data on a fiber optic medium to a copper medium, or any other media that is used in the building site 120. As described further below, the optical network terminal 145, including one or more output devices, may perform one or more operations that facilitate the signaling of a weather condition at building site 120.

The building site 120 also includes a rectifier 147, which receives electrical power from an outlet and delivers power to the optical network terminal 145. However, power may also be supplied to the optical network terminal 145 by a battery or uninterruptible power supply (not shown). In one example, the battery or uninterruptible power supply is electrically coupled to the optical network terminal 145. Also, the battery or uninterruptible power supply may be either inside or outside of the housing that encases the optical network terminal 145.

The optical network terminal 145 is shown to be directly coupled to a wall of the building site 120. However, the optical network terminal 145 may also be separate from the building site 120. The optical network terminal 145 may be located either inside or outside of the building at the building site 120. As used herein, the term "coupled" includes coupling via a separate object. The term "coupled" also includes "directly coupled," in which case the two objects touch each other in some way. The term "coupled" also encompasses two or more components that are continuous with one another by virtue of each of the components being formed from the same piece of material. Also, the term "coupled" includes chemical coupling, such as via a chemical bond. The term "coupled" may also include mechanical, thermal, electrical, or wireless coupling.

The building site 120 is an example of a dwelling, residence, or location of a person or group that may utilize any number of communications services. The building site 120 is shown as a residence in the illustrated example, however, the building site 120 may also be an office, business, or other structure wired or otherwise suitably equipped to provide telephone, data, and other communication services to one or more customers.

The building site 120 also includes multiple devices, including communication device 125, client 130, telephone 150, and television 155. The telephone 150 may be a standard device that provide dialing and voice conversation capabilities. Telephone 150 may be integrated in any number of other devices or may be used in different forms. For example, the home telephone 150 may be part of an intercom system. In another embodiment, the home telephone 150 may be integrated with a personal computer, such as client 130.

The communications services accessible from the telephone 150 may include standard telephone service or VoIP telephone service. The telephone 150 may be a VoIP telephone or may be a standard telephone that includes a modem and/or VoIP adapters for enabling VoIP communications. A special dial tone, message, web alert, or other feedback may specify once or repeatedly that the telephone 150 is implementing a particular feature. For example, the telephone 150 may sound any audible noise, such as a double chirp, when receiving a signal from the optical network terminal 145 that indicates a weather condition, such as a severe weather condition. The user may cancel use of any features by reentering the feature command or a cancellation command.

The communication device 125 is any device capable of communicating with a user or another device. Non-limiting examples of the communication device 125 includes phones, including landline and cellular phones, walkie talkies, personal computers, personal digital assistants, music players, and laptop computers. Communication devices allow a user to execute a wide variety of applications, including executing voice calls, text messaging, internet browsing, music playback, memo recording, personal organization functions, e-mail, instant messaging, camera and camcorder applications, radio reception, video games, and modem functions for other devices. The communication device 125 may perform any operation, such as display a graphic or sound a noise, when receiving a signal from the optical network terminal 145 that indicates a particular weather condition, such as a severe weather condition.

The client 130 may be a personal computer for performing and executing programs and instructions and accessing data from the data source 105. The client 130 may perform any operation, such as display a graphic or sound a noise, when receiving a signal from the optical network terminal 145 that indicates a particular weather condition, such as a severe weather condition. Such operation may vary depending on the particular weather condition signaled from the optical network terminal 145. Also, the client 130 may be any computing device suitable for communicating through a network connection. In one embodiment, the building site 120 may include a wireless router, adapter, switch, hub, or other suitable interface that allows the client 130 to communicate with a wireless local area network or wireless personal area network that receives data using the communications system 100. The client 130 may transmit or receive data through a wireless connection. The optical line terminal 110 and/or the optical network terminal 145 may use a graphical user interface (GUI), such as website or program accessible from the client 130 in order to enter and receive input preferences for a user.

At any time, a user may select to enable, order, initiate, implement, or otherwise request the features described herein. For example, the user may use a command that causes a function trigger of a device or the device itself, such as the optical line terminal 110, optical splitter 115, optical network terminal 145, or any of the devices located at the building site 120. In one example, the user may submit a command using any of the devices at the building site 120 to activate any of the features executed by the optical network terminal 145 as described in the illustrative embodiments herein. For example, a user may dial any predetermined combination of characters on the telephone 150 or the communication device 125, and then enter a pass code, account code, password, pin number, or other identifier. The command may also be a password, voice activated, time activated, preset by user selection or any other suitable option, setting, command, or user input. In another embodiment, the various features may be implemented using tactile commands.

The communications system 100 may further include any number of hardware and software elements that may not be shown in the example of FIG. 1. For example, in order to facilitate VoIP communications, the communications system 100, the optical line terminal 110, the optical splitter 115, and the optical network terminal 145 may include additional application servers, media servers, service brokers, call agents, edge routers, gateways (signaling, trunking, access, sub, etc.), IP network service providers, adapters, exchanges, switches, users, and networks.

Figure 2:
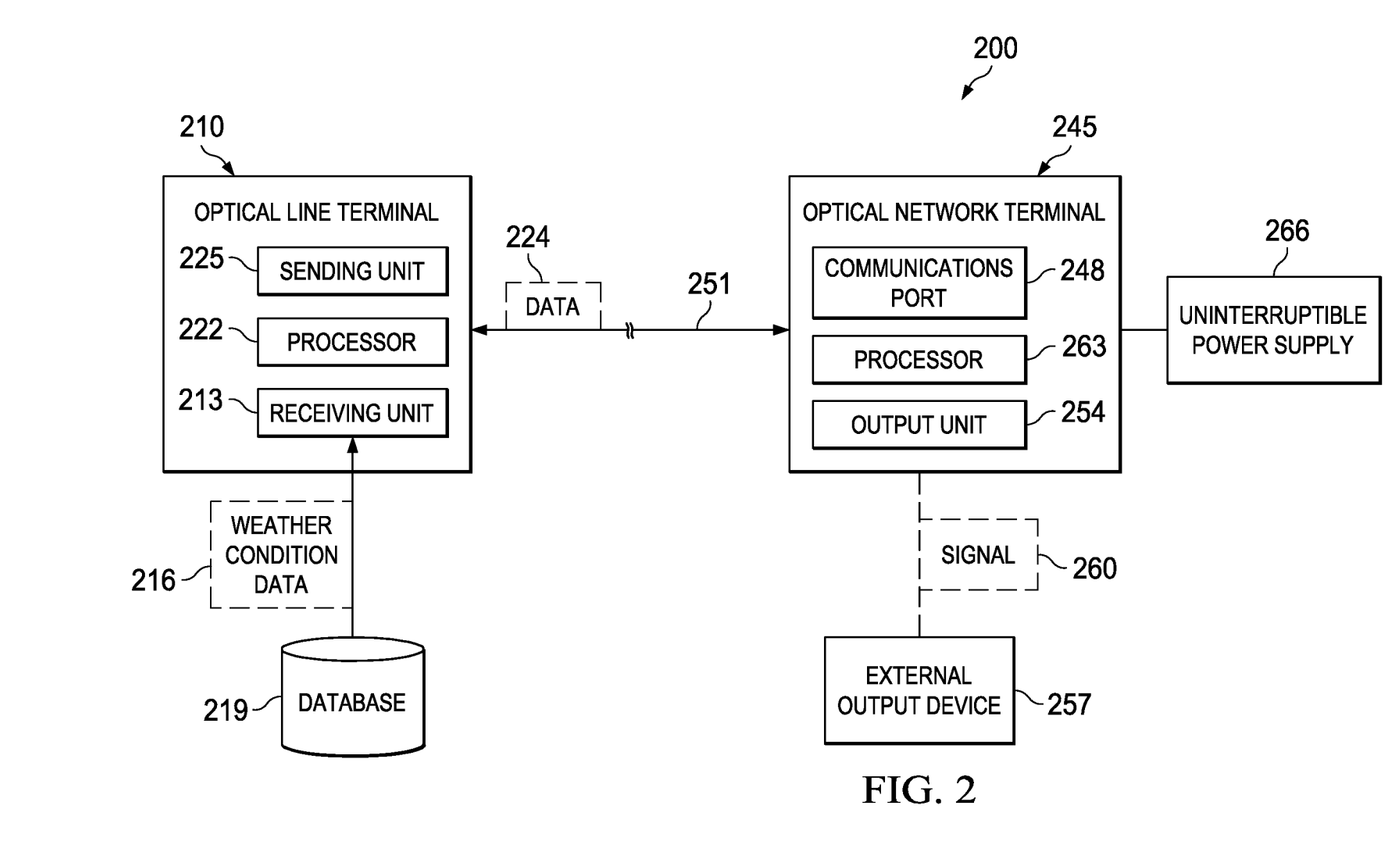
FIG. 2 is a schematic block diagram of a system for signaling a weather condition in accordance with an illustrative embodiment.

Referring to FIG. 2, a schematic block diagram of a system for signaling a weather condition is depicted in accordance with an illustrative embodiment. In particular, data processing system 200 includes an optical line terminal 210 and an optical network terminal 245. The optical line terminal 210 is functionally analogous to the optical line terminal 110 in FIG. 1. The optical network terminal 245 is functionally analogous to the optical network terminal 145 in FIG. 1.

The optical line terminal 210 may include a receiving unit 213. The receiving unit 213 may receive weather condition data 216 from a database 219. The database 219 is any database that contains data regarding weather. For example, the database 219 may be a publicly available or privately administered database, such as a database administered by the National Oceanic and Atmospheric Administration or www.weather.com. The weather condition data 216 may include weather data for any number of counties, cities, or other geographical demarcation. In one example, the weather condition data 216 includes weather data for the regions that are serviced by the optical line terminal 210. In another embodiment, the weather condition data 216 indicates at least one of a type of weather condition, a severity of the weather condition, a location of the weather condition, or a proximity of a weather condition to any of the optical network terminals 245 serviced by the optical line terminal 210.

The receiving unit 213 may provide for communications with other data processing systems or communication devices. In one example, the receiving unit 213 includes a network interface card. The receiving unit 213 may provide communications through the use of either or both physical and wireless communication links.

The optical line terminal 210 also includes a processor 222. The processor 222 may be in the communication with the receiving unit 213. In one embodiment, the processor 222 determines whether the weather condition data 216 indicates a weather condition, such as a severe or potentially destructive weather condition, at the location of the optical network terminal 245. Non-limiting examples of a severe weather condition include a tornado, flood, thunderstorm, earthquake, tremor, aftershock, hailstorm, hurricane, tsunami, cyclone, excessive heat, excessive cold, blizzard, ice storm, smog, or high levels of ultraviolet light.

For example, the receiving unit 213 may receive weather condition data 216 for one or more counties, including counties that are serviced by the optical line terminal 210. In the case in which the weather condition data 216 for these one or more counties indicates the presence of severe weather condition, the processor 222 may determine whether the weather condition data 216 indicates the presence of a severe weather condition at any of the optical network terminals serviced by the optical line terminal. In one embodiment, the processor 222 may use the services addresses of the optical network terminals to make this determination; in this embodiment, the optical line terminal 210 may store the service addresses of the optical network terminals that the optical line terminal services, and use these stored service address as a reference to determine whether the weather condition data 216 affects the respective optical network terminal locations.

The processor 222 may serve to execute instructions for software that may be loaded into a memory included in the optical line terminal 210. The processor 222 may be a set of one or more processors or may be a multi-processor core, depending on the particular implementation. Further, the processor 222 may be implemented using one or more heterogeneous processor systems in which a main processor is present with secondary processors on a single chip. As another illustrative example, the processor 222 may be a symmetric multi-processor system containing multiple processors of the same type.

The optical line terminal 210 also includes a sending unit 225. The sending unit 225 may be in communication with the processor 222 and the receiving unit 213. In one embodiment, the sending unit 225 sends data 224, which indicates a weather condition, to the optical network terminal 245; this sending operation may be based on or use a service address of the optical network terminal 245. In one example, the data 224 indicates a severe weather condition, such as a severe weather condition in the proximity of the optical network terminal 245. In another embodiment, the sending unit 225 sends the data 224 to a plurality of optical network terminals that are affected by the weather condition based on the service addresses of the plurality of optical network terminals.

In one embodiment, the processor 222 may determine whether to send the data 224 from the sending unit 225 based on at least one of the following factors: a type of weather condition, a severity of the weather condition, and a proximity of the weather condition to the optical network terminal 245. For example, the optical line terminal 210 may be programmed to send the data 224 in response to one or more of these factors having predetermined values, such as particular type of weather condition, a weather condition severity that exceeds a minimum threshold weather condition severity, or a weather condition proximity that is less than a maximum threshold weather condition proximity to the optical line terminal 210.

The optical network terminal 245 includes a communications port 248. The communications port 248 may be adapted to be coupled to a fiber optic cable 251, such as a fiber optic cable from an optical splitter. The communications port 248 may be further adapted to receive data 224 via the fiber optic cable 251.

The optical network terminal 245 may also include an output unit 254. The output unit 254 may be in communication with the communications port 248. In one embodiment, the output unit 254 may be adapted to send a signal in response to the communications port 248 receiving the data 224. The output unit 254 may be any device that is capable of emitting a signal, such as an audio signal, video signal, or other type of signal.

For example, the output unit 254 may be a speaker that is built into the optical network terminal 245. In this example, the speaker may be inside of or at the surface of the housing that encases the optical network terminal 245. In the example in which the output unit 254 is a speaker, the signal emitted by the output unit 254 is an audio signal. Thus, upon receiving the data 224 that indicates a severe weather condition in the proximity of the optical network terminal 245, the speaker may emit a sound that alerts a user of the severe condition. The user may then take any necessary precautions to mitigate or prevent harm from the severe weather condition. In another example, the output unit 254 may also be a siren, and the signal emitted by the siren may be a loud and/or horn-like sound.

In another example, the output unit 254 may be a light emitting device. In this example, the signal emitted by the output unit 254 may be a light signal. In one embodiment, the audio signal emitted by a speaker or the light signal emitted by a light emitting device may vary depending on the type of weather condition, a severity of the weather condition, and a proximity of the weather condition to the optical network terminal 245. For example, the pitch of an audio signal may increase as the severe weather condition becomes more proximate to the optical network terminal 245.

In another embodiment, the signal may be a data transmission to an external output device 257; this signal is shown in FIG. 2 as signal 260. The external output device 257 is located outside of the housing that encases the optical network terminal 245. The external output device 257 may receive the signal 260 from the optical network terminal 245. The external output device 257 may be in communication with the optical network terminal 245 via a wire or wireless connection, including structural wiring in a building that is used for additional purposes. In one embodiment, the external output device 257 emits an alert in response to receiving the signal 260 from the optical network terminal 245, thus alerting a user as to the presence of a severe weather condition.

The external output device 257 may be a speaker, light emitting device, a home stereo system, or any of the devices in the building site 120 in FIG. 1, including the client 130, the communication device 125, the television 155, or the telephone 150. Any combination of these devices may emit an alert in response to receiving the signal 260 from the optical network terminal 245. For example, the television may display a message, the telephone 150 or communication device 125 may vibrate or emit an audio alert, or the client 130 may display a dialog box that indicates the presence and details of a severe weather condition.

In one embodiment, the optical network terminal 245 may be able to emit a signal or alert using a plurality of output devices, both internal and external to the optical network terminal 245. In this embodiment, the plurality of output devices may include any combination of the output devices, including the external output devices, described herein. The processor 263 of the optical network terminal 245 may be adapted to select at least one output device in the plurality of output devices. A signal or alert from the at least one output device selected by the processor 263 may indicate the weather condition, including a severe weather condition. Also, the at least one output device may be adapted to send the signal or alert in response to the communications port 248 receiving the data 224.

In another embodiment, a user may dial one or more characters on the telephone 150, the communication device 125, or the client 130 to receive information regarding a weather condition indicated by the data 224. In one example, the one or more characters may be *55. The user may dial *55 in response to the output unit 254 and/or external output device 257 emitting a signal or alert. The details received as a result of dialing *55 may further inform a user of a severe weather condition, and allow the user to take additional or more effective safety precautions. In another embodiment, a component of the optical line terminal 210, such as receiving unit 213, may use the service address of the optical network terminal 245 to determine whether the severe weather is affecting the location of the optical network terminal 245; this determination may be performed in response to a user dialing *55.

The illustrative embodiments may deliver a signal or alert to a user even in the absence of power to a building associated with the optical network terminal 245. In one embodiment, an uninterruptible power supply 266 may be electrically coupled to the optical network terminal 245. The uninterruptible power supply 266 may supply power to the optical network terminal 245. In one embodiment, the uninterruptible power supply 266 supplies power to the optical network terminal 245 during a power outage to the building associated with the optical network terminal 245. The uninterruptible power supply 266 may also be a battery.

Figure 3:
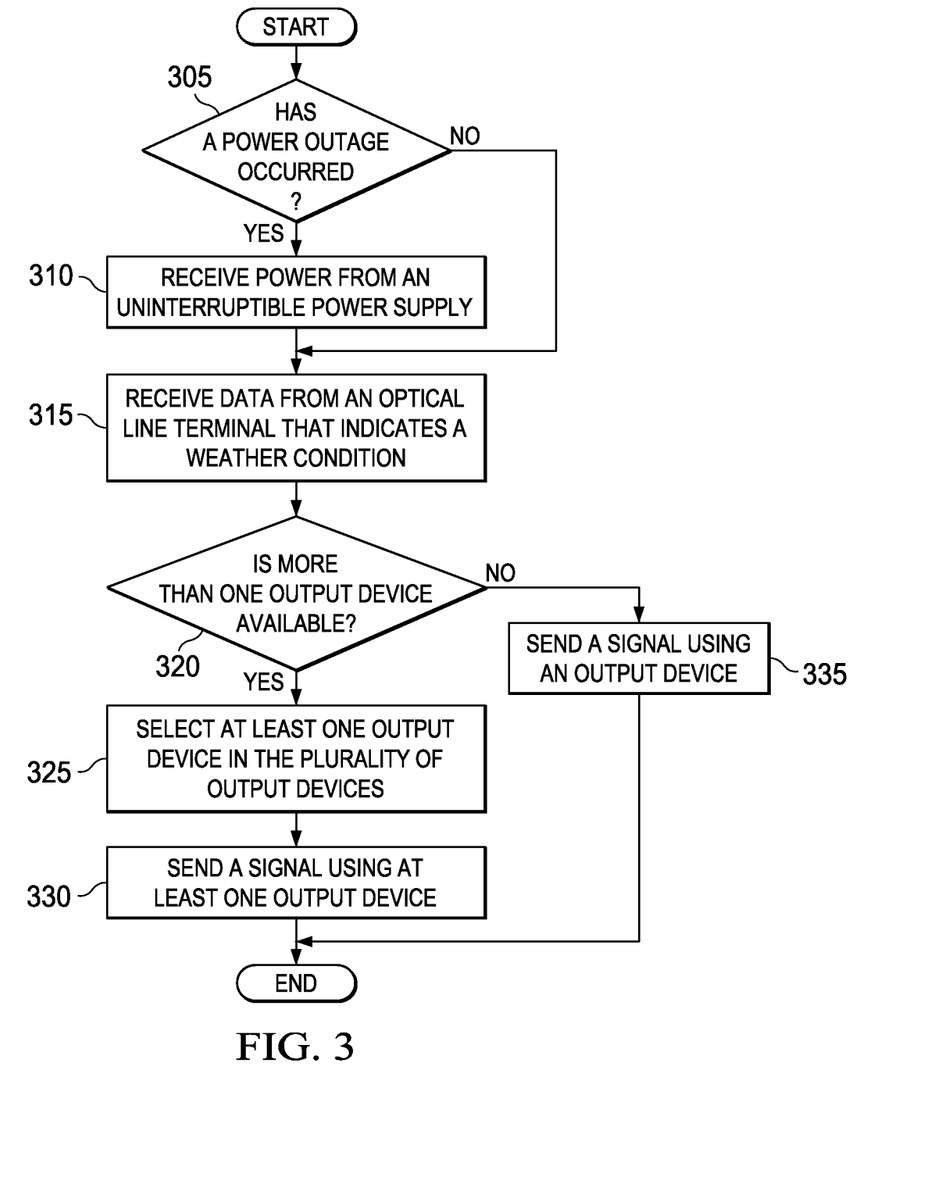
FIG. 3 is a flowchart illustrating a process for signaling a weather condition in accordance with an illustrative embodiment.

Turning now to FIG. 3, a flowchart illustrating a process for signaling a weather condition is depicted in accordance with an illustrative embodiment. The process illustrated in FIG. 3 may be implemented by an optical network terminal, such as optical network terminal 145 in FIG. 1 or optical network terminal 245 in FIG. 2.

The process begins by determining whether a power outage has occurred (step 305). If the process determines that a power outage has occurred, the process causes the optical network terminal to receive power from an uninterruptible power supply (step 310). The process then proceeds to step 315.

Returning to step 305, if the process determines that a power outage has not occurred, the process receives data from an optical line terminal that indicates a weather condition, such as a severe weather condition (step 315). The process determines whether more than one output device is available (step 320). If the process determines that more than one output device is available, the process selects at least one output device in the plurality of output devices (step 325). The process sends a signal using the at least one output device (step 330). The process then terminates. Returning to step 320, if the process determines that more than one output device is not available, the process send the signal using the output device (step 335). The process then terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

The principles of the present invention can take the form of an entirely hardware embodiment, an entirely software embodiment or an embodiment containing both hardware and software elements. In one embodiment, the invention is implemented in software, which includes but is not limited to firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code may include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or J/O devices (including but not limited to keyboards, displays, and pointing devices) can be coupled to the system either directly or through intervening J/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for signaling a weather condition, the system comprising:
   an optical line terminal comprising:
      a network interface that receives data indicating a weather condition;
      a processor that executes instructions to determine whether to send the data indicating the weather condition to one or more optical network terminals, the determination comprises determining a type of weather condition associated with the data, determining whether a severity of the type of weather condition associated with the data exceeds a minimum threshold value for the type of weather condition, and determining whether a proximity of the type of weather condition associated with the data is within a proximity threshold to the one or more optical network terminals; and responsive to a determination that the type of weather condition associated with the data exceeds the minimum threshold value for the type of weather condition and that the proximity of the type of weather condition associated with the data is within the proximity threshold to the one or more optical network terminals, sending, via the network interface, the data indicating the weather condition to the one or more optical network terminals;
   an optical network terminal comprising:
      a communication port adapted to be directly coupled to a fiber optic cable, the communication port further adapted to receive the data that indicates the weather condition via the fiber optic cable;
      a signal conversion unit that converts fiber-optic light signals to electric signal for transfer on a copper medium;
      an output unit, in communication with the communication port, adapted to send a signal to one or more of a plurality of external output devices in response to the communication port receiving the data that indicates the weather condition, wherein the signal comprises an audio signal, the audio signal generated to produce a different audio alert based on a type of weather condition; and
   a second processor configured to execute instructions to:
      receive a request from any of the plurality of external devices for additional information regarding the weather condition and provide the additional information regarding the weather condition to a requesting external device in response to receiving the request, wherein the request is initiated in response to receiving a user-entered predetermined character code, wherein a user manually enters each character of the predetermined character code to initiate the request.

2. The system of claim 1, wherein the second processor is further configured to execute instructions to receive commands from any of the plurality of external output devices to activate any of a plurality of features of the optical network terminal.

3. The system of claim 1, further comprising:
   a battery electrically coupled to the optical network terminal, wherein the battery supplies power to the optical network terminal.

4. The system of claim 1, wherein the second processor is further configured to execute instructions to modify a volume of the different audio alert based on a severity of the weather condition.

5. The system of claim 1, wherein the optical line terminal further comprises a database that stores the service addresses of all optical network terminals that the optical line terminal provide services to, and wherein the processor is further configured to execute instructions to retrieve the service addresses of the optical network terminals from the database in making the proximity determination.

6. The system of claim 1, wherein the type of weather condition is selected from a list of types of weather conditions that comprises a tornado warning, flooding, thunderstorms, and hailstorm.

7. A method for signaling a weather condition, the method comprising:
   receiving data via light signals, at an optical network terminal, from an optical line terminal that indicates a weather condition, wherein, prior to the optical network terminal receiving the data, the optical line terminal determines a type of weather condition associated with data indicating the weather condition, determines whether a severity of the type of weather condition associated with the data exceeds a minimum threshold value for the type of weather condition, determines whether a proximity of the type of weather condition associated with the data is within a proximity threshold to the optical network terminal, and, responsive to a determination that the type of weather condition associated with the data exceeds the minimum threshold value for the type of weather condition and that the proximity of the type of weather condition associated with the data is within the proximity threshold to the optical network terminal, sends the data indicating the weather condition to the optical network terminal via the network interface;
   generating an electrical signal operable to signal information regarding the weather condition;

sending the electrical signal to a plurality of external output devices in response to receiving data from the optical line terminal, the electrical signal indicating the weather condition, wherein the electrical signal comprises an audio signal, the audio signal generated to produce a different audio alert based on a type of weather condition;

receiving a request from any of the plurality of external devices for additional information regarding the weather condition, wherein the request is initiated in response to receiving a user entered predetermined character code, wherein a user manually enters each character of the predetermined character code; and providing the additional information regarding the weather condition to a requesting external device in response to receiving the request.

8. The method of claim 7, further comprising:

determining whether to transmit the electrical signal to either a speaker or a light emitting device of the optical network terminal based on a type of weather condition, a severity of the weather condition, and a proximity of the weather condition to the optical network terminal.

9. The method of claim 7, further comprising:

receiving commands from any of the plurality of external output devices to activate any of a plurality of features of the optical network terminal; and activating a requested feature of the optical network terminal in response to receiving the command.

\* \* \* \* \*